US006445159B1

(12) United States Patent
Ramsden

(10) Patent No.: US 6,445,159 B1
(45) Date of Patent: Sep. 3, 2002

(54) POWER SHARING METHOD AND CIRCUIT FOR SIMULTANEOUSLY CHARGING MULTIPLE LOADS

(75) Inventor: Martin H. Ramsden, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/957,953

(22) Filed: Sep. 24, 2001

(51) Int. Cl.[7] ................................. H02J 7/00
(52) U.S. Cl. ..................................... 320/119
(58) Field of Search ........................ 320/106, 107, 320/110, 112, 116, 118, 119, 125

(56) References Cited

U.S. PATENT DOCUMENTS 5,757,163 A    5/1998  Brotto et al.
5,955,868 A  * 9/1999  Kaite et al. ............... 320/119
6,157,167 A  * 12/2000 Schwartz et al. .......... 320/116

* cited by examiner

Primary Examiner—Edward H. Tso
Assistant Examiner—Pia Tibbits
(74) Attorney, Agent, or Firm—Philip H. Burrus, IV

(57) ABSTRACT

This invention includes a circuit for charging multiple batteries simultaneously. The circuit monitors the amount of current being delivered to a first battery and compares it to a maximum available current. The circuit then delivers the difference to at least a second battery. The circuit includes a current sensing resistor and comparator for actuating a series switch to electrically couple and decouple a second battery depending upon the demands of the first battery. An optional microprocessor can manipulate a reference threshold to allow simultaneous charging of multiple batteries. The invention greatly reduces the time needed to charge a primary and spare battery.

11 Claims, 3 Drawing Sheets

POWER SHARING METHOD AND CIRCUIT FOR SIMULTANEOUSLY CHARGING MULTIPLE LOADS

BACKGROUND

TECHNICAL FIELD

This invention relates generally to battery charging devices, and more particularly to multiple battery charging devices for electronic devices.

BACKGROUND ART

Portable computers, personal digital assistants (PDA's ), cellular telephones, pagers, calculators, and other such electronic devices are commonplace in today's mobile society. One of the reasons portable electronic devices are so popular is that they provide a user with virtual freedom regarding the location of their use, as long as a source of power is readily available. Although these devices may be powered by plugging them into a standard AC outlet, AC power is often not convenient or readily available. Hence, their real portability and utility comes from their being powered by batteries.

Although battery technology has progressed greatly in recent decades, a single battery is sometimes unable to meet a user's demands. For example, many cellular telephone service providers are offering plans with 3000 plus minutes of talk time or more per month. Some business people talk on their cellular phones six or more hours per day. Typical cellular telephone batteries provide only three to four hours of talk time before needing to be recharged. Consequently, some users carry two or more batteries with them so that spare is ready when the first battery dies. To remain on the go, users now want shorter charge times in addition to extended battery life. They also want to be able to quickly charge two or more batteries at the same time.

One solution to the problem of how to quickly recharge two or more batteries is to charge two batteries serially. In other words, when the two batteries are placed in the same charger, the charger completely charges the first battery. The charger then switches to the second battery and charges it. Total charging time is the charging time of one cell multiplied by the number of cells. Another solution to the problem with quickly recharging multiple batteries was to charge each battery in a charging system with its own power line or charging system.

However, both solutions present problems. A problem with the first solution is that it is not efficient. The second solution requires a prohibitive amount of space. For these reasons, there is a need for an adaptive multiple battery charging apparatus that allows simultaneous charging of multiple batteries with a single battery charging system.

DETAILED DESCRIPTION OF THE INVENTION

Figure 1:
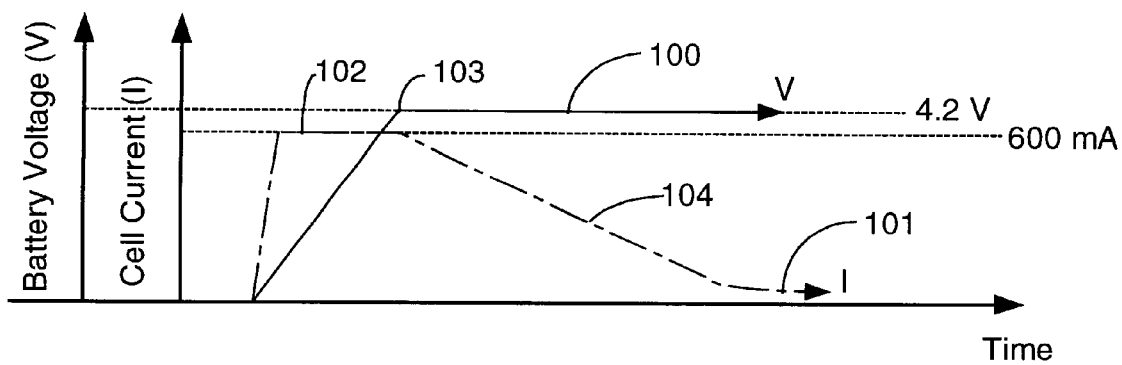
FIG. 1 is a typical voltage and current profile occurring in lithium based batteries.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention provides a method and apparatus for reducing the charge time of batteries in a charger. Typical chargers for portable electronic products, including pagers, personal data assistants, cellular telephones and radios, often include multiple pockets. A first pocket is provided for accommodating the portable electronic device having a battery coupled thereto. The second pocket accommodates a spare rechargeable battery that can be coupled to the portable electronic device at a later time. With two pockets, a user is able to charge his primary battery and a spare battery for later use.

Most prior art chargers charge batteries in the two pockets serially. In other words, they charge the primary battery pocket first. Once the primary battery has been fully charged, the charger switches to the second pocket to charge the spare battery. As it can take more than three hours to charge an ordinary lithium battery, this serial process can take as much as six hours depending upon the initial state of charge of the two batteries.

Referring now to FIG. 1, illustrated therein is a typical voltage and current profile associated with lithium based rechargeable batteries. Line 100 represents the voltage of a lithium cell as it is being charged. The voltage ramps up while the charger delivers a predetermined current. Once the battery reaches its maximum voltage, typically 4.1 or 4.2 volts, the charger will begin to taper the current. Line 101 represents this charging current. One can see that the current is being delivered at its maximum value at segment 102. Once the battery voltage reaches its maximum, shown at vertex 103, the current begins to taper off. The tapering is shown as segment 104. For exemplary purposes only, the maximum current shown in FIG. 1 is 600 mA. This value may be higher or lower depending upon the system requirements.

This invention takes advantage of the tapering current to charge two or more batteries simultaneously. When a primary battery in the front pocket reaches its maximum value, the current begins to taper. This tapering results in the current being delivered to the primary battery to be less than the capacity of the power source. This invention takes the difference between maximum current available and current being delivered to the primary cell and delivers it to the spare cell. In so doing, this invention greatly reduces the time required to charge two batteries.

Figure 2:
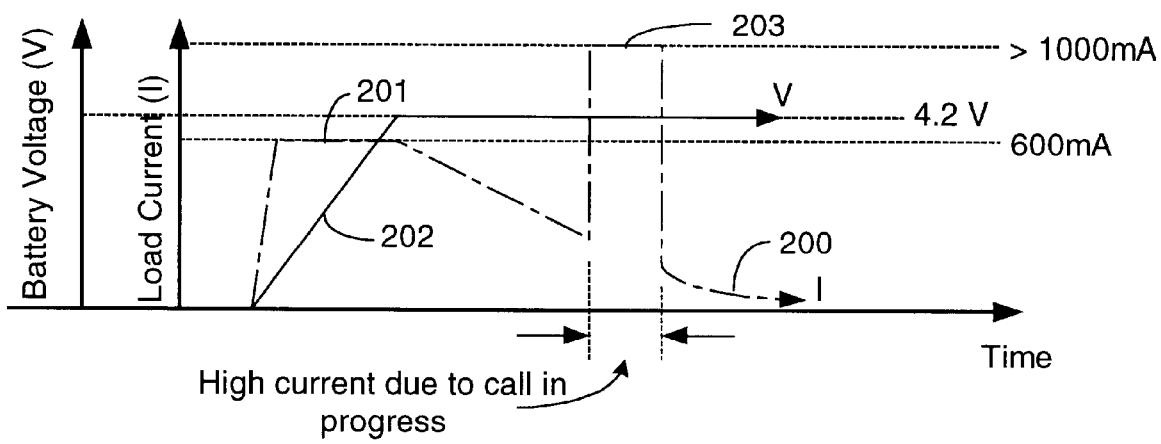
FIG. 2 illustrates the current demand upon a charger having both a battery and a phone coupled thereto.

To illustrate by way of example, refer now to FIG. 2. Illustrated in FIG. 2 is the load current profile of a charger having both a primary electronic device, like a cellular telephone for example, and a spare battery coupled thereto. Line 200 represents this profile. Assume that a phone having a primary battery that is fully charged is positioned in the first pocket of a two pocket charger. Also assume that a spare battery is in the second pocket. As the primary battery coupled to the phone is fully charged, the charger will begin to charge the spare battery at its maximum current. This is shown at segment 201. The battery voltage begins to rise correspondingly at line 202.

When the phone in the front pocket initiates or receives a call, it requests a large current, generally more than 500 mA, from the power source. When the phone is in the pocket, the charger acts as the power source. As a result, the total load demand for current is greater than the maximum the charger has to deliver. This is shown at segment 203.

Figure 3:
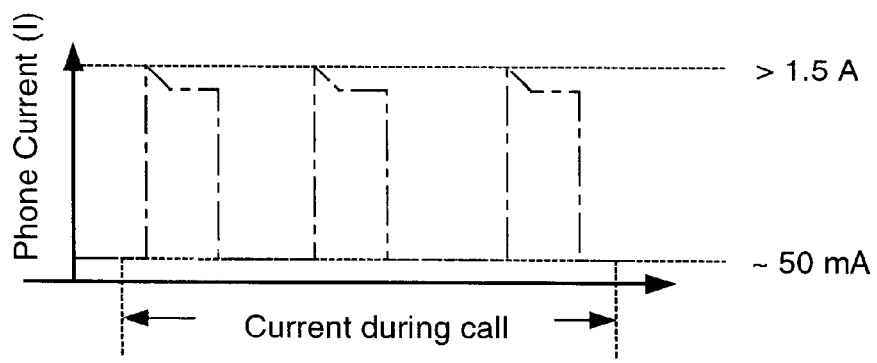
FIG. 3 is a typical transient current waveform for digital cellular phones.

It should be noted that many of today's cellular phones are digital. When they make transmissions, they draw power in intermittent bursts as shown in FIG. 3. A typical burst may have a 1.5 A peak with a 50 mA nominal current. Thus, while the phone may demand 500 mA average current, this is actually an average of a series of current pulses.

Figure 4:
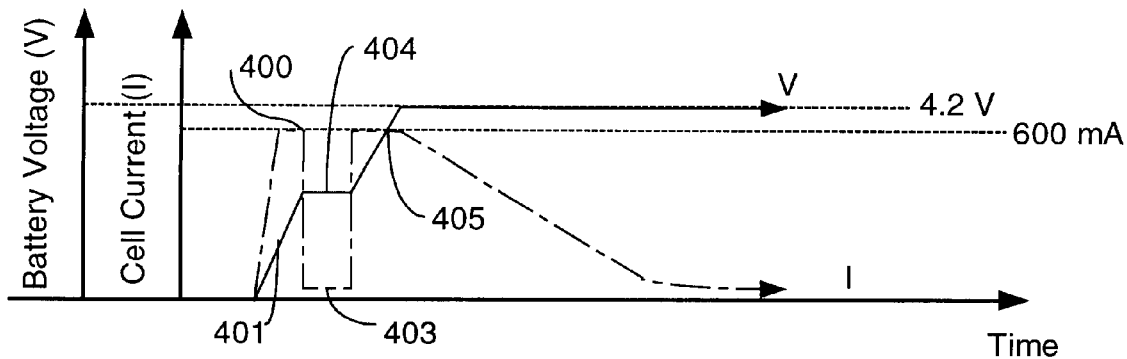
FIG. 4 is a voltage and current profile for a battery being charged in a charger in accordance with the invention.

This invention allows the phone to make the call by disabling the current to the spare battery and delivering it to the primary pocket whenever a phone call is transmitted. The resulting voltage and current profile is shown in FIG. 4. The current is delivered at its maximum rate as previously described at segment 400. The spare battery voltage correspondingly increases at segment 401. When the primary pocket demands current in excess of the maximum available, this invention disables the current to the spare battery as shown at segment 403. As current is no longer flowing to the spare battery, the voltage stops rising as shown at segment 404. Once the call is completed, the current resumes at its maximum rate at segment 405.

Figure 6:
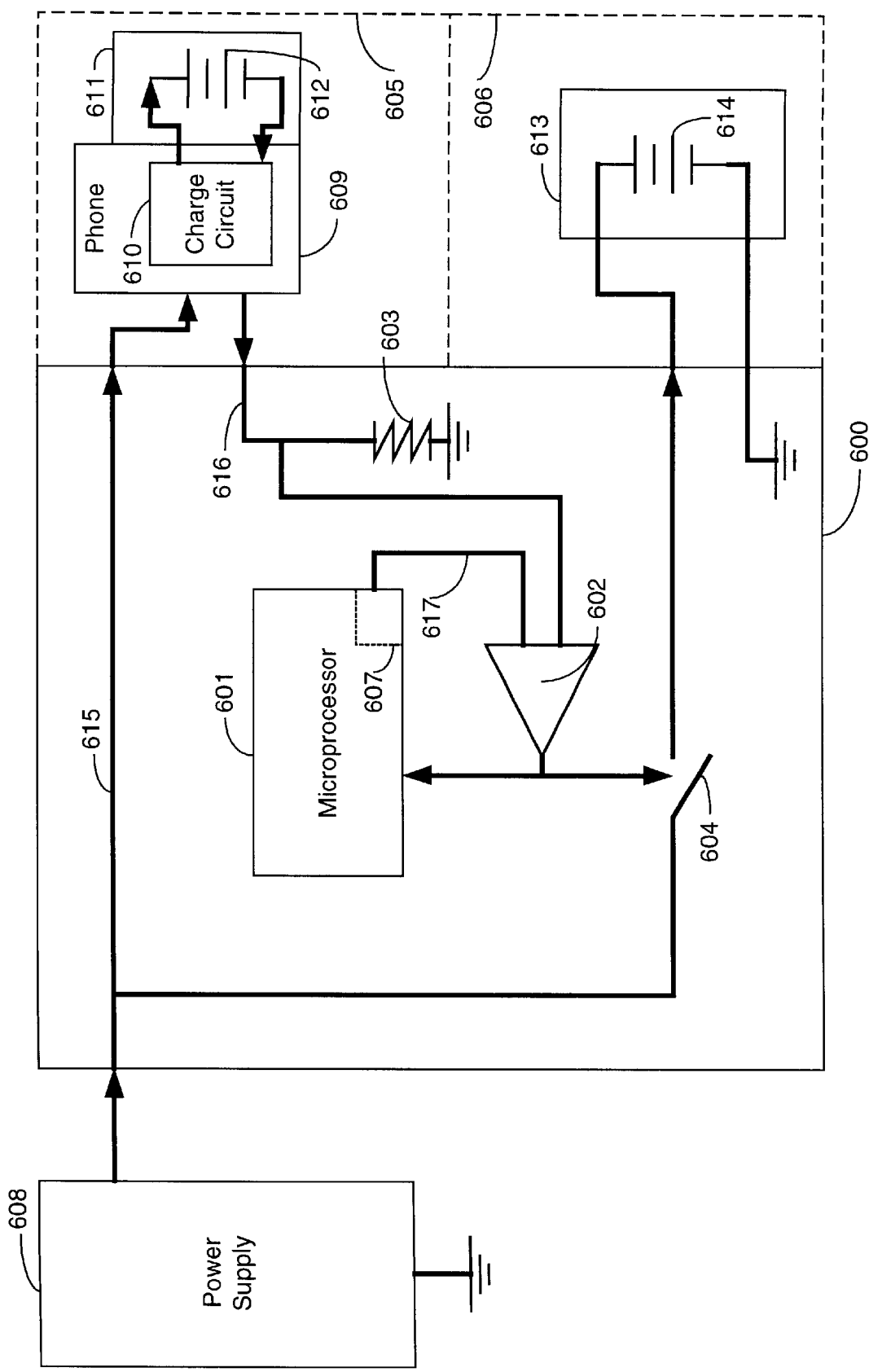
FIG. 6 is a schematic block diagram of a charging circuit in accordance with the invention.

Referring now to FIG. 6, illustrated therein is a schematic block diagram in accordance with the invention. A charger 600 is provided comprising a microprocessor 601, a comparator 602, a current sense resistor 603, a serial switch 604, a first pocket 605 and a second pocket 606. In a preferred embodiment, the serial switch 604 is a transistor that can operate in both the linear and saturation regions. The charger 600 has a power supply 608 for supplying power. The power supply 608 may be either internal or external to the charger 600.

The first pocket 605 accommodates a portable electronic device. In this exemplary embodiment, the portable electronic device is a cellular telephone. Typical cellular telephones include on-board charging circuitry, although the charging circuitry can also be disposed in the charger 600. In this particular embodiment, a cellular telephone 609 having on-board charging circuitry 601, with a primary battery 611 coupled thereto, is positioned in the first pocket 605. The primary battery 611 contains at least one rechargeable cell 612. A spare battery 613 having at least one rechargeable cell 614 is positioned in the second pocket 606.

Power flows from the power supply 608 to the charging circuit 610 in the phone through electrical conductors 615 disposed within the charger. This power flows through the primary battery 611 and back through the return path 616 to ground. A current-sense resistor 603 is coupled serially in the return path 616. When current flows through the current-sense resistor, a voltage is created. This voltage is fed into a comparator 602. The comparator 602 also has a reference voltage coupled from the microprocessor via the voltage reference line 617. In a preferred embodiment, the microprocessor 601 includes an on-board voltage reference 607, although the voltage reference could be external as well.

While the current being drawn by the phone 609 exceeds a predetermined threshold, causing the voltage across the current-sense resistor 603 to be greater than the voltage on the voltage reference line 604, the comparator keeps the serial switch 604 open. This prevents current from flowing to the second pocket 606. Once the current being drawn by the phone 609 begins to taper, e.g. when the primary battery 611 is fully charged, the voltage across the currentsense resistor 603 falls below the voltage on the voltage reference line 617. This allows the spare battery 613 in the rear pocket 606 to begin to charge.

It can now be understood how the profile of FIG. 4 is generated. Assuming that the serial switch 604 is closed and the spare battery 613 is charging, when a call is in initiated the phone 609 demands an increase in current. This causes the voltage across the current-sense resistor 603 to increase, causing the comparator 602 to toggle, thereby causing the serial switch 604 to open. Once the call is completed, the comparator 602 toggles again, allowing the spare battery 613 to resume charging.

While the invention has been described thus far in a "binary" fashion, i.e. either the serial switch 604 is completely on or completely off, the invention is not so limited. The serial switch 604 can also be run in a linear mode via a feedback loop controlled by the microprocessor 601. When the primary battery 611 reaches its maximum voltage, the current going into the battery begins to taper. The microprocessor 601 is then able to allow a small amount of current to flow by adjusting the on-board voltage reference 607 to a level that complements the current flowing to the primary battery 611. For example, if the current flowing to the primary battery 611 has tapered to 400 mA, and the maximum available is 600 mA, the microprocessor 601 can then set the on-board voltage reference 607 to a level that allows 200 mA to flow into the spare battery. It is in this manner that the invention provides for simultaneous charging of multiple batteries without the risk of depriving the primary battery and portable electronic device of its necessary current.

An optional A/D port on the microprocessor 601 could monitor the voltage across the current-sense resistor as well. In this manner, the microprocessor 601 would continually be aware of the amount of current being used by the first pocket 605. By adjusting the output of the onboard voltage reference 607 to the appropriate level. Most power supplies have an identifier readable by microprocessors. This identifying device generally conveys maximum power output. The microprocessor 601 is thus able to compute the appropriate output level of the on-board voltage reference 607.

Figure 5:
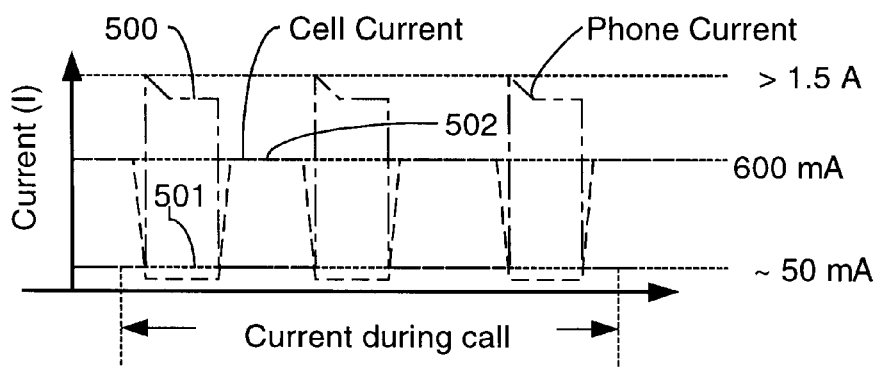
FIG. 5 is a current profile for a charger in accordance with the invention having a both phone and battery coupled thereto.

When the comparator 602 is running freely, it has a transient response that is fast enough to accommodate switching between digital current pulses drawn by the phone 609 while transmitting. Referring now to FIG. 5, illustrated therein is the current drawn by the second pocket of a charger in accordance with the invention. Peak 500 shows a typical current pulse as described above in the discussion of FIG. 3. Segment 501 shows the current drawn by the second pocket while the phone is drawing peak 500. The comparator has toggled, causing the serial switch to open. Thus, segment 501 represents little or no current. When the phone is no longer drawing a pulse, however, the comparator causes the serial switch to close, thereby allowing a burst of current to flow to the second pocket as is illustrated by segment 502.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while one preferred embodiment is designed for cellular telephones, a charger with any electronic device an spare battery is well suited for the invention.

What is claimed is:

1. A charging circuit comprising:
   a. a power supply electrically coupled to the charging circuit;
   b. at least two connections for electrically coupling to at least two rechargeable batteries;
   c. current sensing circuitry electrically coupled to a first connection for electrically coupling to a first rechargeable battery;
   d. a reference voltage;
   e. circuitry for comparing an output of the current sensing circuitry to the reference voltage; and
   f. a switch electrically coupled serially between the power supply and at least a second connection for electrically coupling to at least a second rechargeable battery;
   wherein when the output of the current sensing circuitry exceeds the reference voltage, the circuitry for comparing the output of the current sensing circuitry actuates the switch.

2. The circuit of claim 1, wherein the current sensing circuitry actuates the switch by a method selected from the group consisting of opening the switch, closing the switch, and operating the switch in a linear mode.

3. The circuit of claim 2, wherein the circuitry for comparing an output of the sensing circuitry to the reference voltage comprises a comparator.

4. The circuit of claim 3, wherein the switch is selected from the group consisting of metal oxide semiconductor field effect transistors, bipolar junction transistors, junction field effect transistors, circuit breakers and relays.

5. The circuit of claim 4, further comprising a microprocessor.

6. The circuit of claim 5, wherein the microprocessor is able to adjust an output level of the voltage reference.

7. A charger for charging two or more batteries, the charger comprising:
   a. at least two pockets, the at least two pockets comprising at least one first pocket and at least one second pocket;
   b. a power supply electrically coupled to the at least two pockets;
   c. a means for monitoring the current delivered to the at least one first pocket;
   d. a means of comparing the current delivered to the at least one first pocket to a predetermined threshold; and
   e. a means of electrically decoupling the at least one second pocket from the power supply when the current delivered to the at least one first pocket exceeds the predetermined threshold.

8. The charger of claim 7, wherein the means of comparing current comprises a comparator.

9. The charger of claim 8, wherein the means of electrically decoupling comprises a transistor.

10. The charger of claim 9, wherein the means of monitoring the current comprises a resistor.

11. The charger of claim 10, wherein the resistor has a value of between zero and one hundred ohms.

\* \* \* \* \*